Patented Sept. 11, 1928.

1,683,886

UNITED STATES PATENT OFFICE.

ROBERT ABBOTT HADFIELD, OF WESTMINSTER, ENGLAND.

MANUFACTURE OF STEEL.

No Drawing. Application filed November 20, 1922, Serial No. 602,293, and in Great Britain June 19, 1922.

Steel, as for example nickel steel, or chromium steel, or nickel chromium steel, can now be made of great purity as regards sulphur and phosphorus, the sulphur being of the order of say about .012% to .015% and the phosphorus of the order of say about .010% or less, the percentages of carbon and alloying metal or metals varying to suit requirements. Such pure steel however, unless very great care is exercised in its manufacture, is liable after casting and particularly after being hardened and tempered, to show flaws or defects arising from unsoundness, due to causes that are not yet fully understood but which at present are believed to be due to the presence of oxygen or other gas or gases or oxide or oxides in the steel, so that such steel cannot be relied upon to at all times and under the varying heat treatments to which it is subjected to adapt it for use, give wholly satisfactory results.

Now the present invention has for its object to manufacture on a commercial scale and in an economical manner, alloy steel or carbon steel that shall not only be of great purity as regards sulphur and phosphorus but shall also be free from any liability to develop flaws or defects after being cast and otherwise treated, including hardening and tempering, to adapt it for use, so that it may confidently be depended upon for the regular production of steel articles of various kinds of reliable quality.

For this purpose, according to the present invention, refined fluid or solid alloy steel or carbon steel, low in sulphur, phosphorus and manganese, such as is produced in a basic open hearth furnace, or material of the kind commercially known as pure ingot iron, low in sulphur, phosphorus, manganese and other elements, or other form of iron low in sulphur, phosphorus and manganese, such for example as that known as pure wrought iron, or a mixture of such pure metals, and constituting in each case refined ferrous base metal, is treated in a basic electric furnace in the presence of a protective deoxidant, other than carbon, and slag forming material, and also, it may be, carbon according to requirements. The refined steel may be of the kind described in the specification of my Letters Patent No. 1,410,749, and the pure wrought iron may be of the kind known as Swedish wrought iron. Refined steel, and pure iron of the character referred to, are each included in the term, refined base metal, sometimes used in the generic sense in the following description and in the appended claims. Such materials will usually be in the form of scrap metal and should be as free as possible from rust.

The basic electric furnace may advantageously be of the Heroult three phase arc furnace type or other similar suitable type of electric furnace. Or it may be a basic electric furnace having upper and lower electrodes. The electric furnace should in either case, in order to obtain the best results, when a solid charge of refined metal is to be dealt with, be well sealed during the melting operation so as to exclude the external air as far as possible. Also, the melting should be effected as quickly as possible. When the purified steel, low in sulphur and phosphorus, to be produced (hereinafter called for distinction flawless steel) is chromium steel, or nickel chromium steel, the de-oxidizing material used may advantageously be composed of ferro-chrome and ferro-silicon. Ferro-chrome containing from about 4 to 8% of carbon and from about 60 to 75% of chromium, and 45% to 50% ferro-silicon, have been found to give satisfactory results in practice. Carbon, if used, will also serve as a deoxidant for reducing any oxide of iron present, for instance as rust, on the solid refined base metal employed, and also for carburizing the refined base metal, the quantity used depending upon the oxidized condition of the base metal, or upon the percentage of carbon required in the finished steel, or upon both of these conditions. The carbon may advantageously consist of anthracite coal, say in the form of nuts, or of small pieces of broken carbon electrodes. If the flawless steel to be produced is nickel steel, or carbon steel, instead of using ferro-chromium as the protective deoxidant, carbon, silicon or other deoxidant not containing chromium, should be used. It is important that the slag obtained on melting should contain as little oxidizing constituents as possible. The protective deoxidant used, becomes in each case, disseminated through the mass of molten metal.

In each case if the percentage of carbon in the melted metal is found to be higher than is desired in the finished steel, as will usually be the case, it is reduced by subjecting the metal to a boiling operation by the aid of an oxidant addition, as for example oxide of iron, for example iron ore such as hematite, that is practically free from or low in sulphur and phosphorus. For this purpose the oxidant employed should be added in small quantities at a time and at suitable intervals so as to avoid, as far as possible, undue oxidation of the metal and to cause a slow and gentle boil of the bath, until samples of metal show that the percentage of carbon has been reduced to a suitable degree. To obtain the best results, the carbon and chromium, when used, should not be allowed to fall too low. During, or after the boiling operation, some of the slag produced is or may be removed. When the percentage of carbon is reduced to the desired amount, the boiling operation is arrested by the addition to the bath of molten metal of ferro-silicon or equivalent deoxidizing material. Material such as limestone, fluor spar and powdered anthracite, to form a reducing and purifying slag, is also applied to the surface of the molten bath further to reduce the percentage of sulphur and oxides in the metal. When, after a suitable interval, a sample of the metal shows that the steel has attained the desired purity as regards sulphur and phosphorus, the composition of the steel as regards carbon, in the case of carbon steel, and in the case of alloy steel, carbon and the alloying metal or metals, for instance nickel, or chromium, or nickel and chromium, can be adjusted to suit requirement, as by the addition to the bath of pig iron of good quality, such as hæmatite pig, and if required, nickel or ferro-chrome or nickel and ferro-chrome, and the metal afterwards tapped into a ladle or other receptacle for casting into ingot or other moulds. A further deoxidant, as for example a small quantity of ferro-aluminium, may be added to the bath before tapping, and a small amount of aluminium may be added to the tapped metal in the ladle or other receptacle as an extra precaution for preventing unsoundness in the steel obtained.

The following is a typical method of producing flawless nickel chromium steel low in sulphur and phosphorus according to the invention, the base material used being basic open hearth refined nickel steel scrap and ordinary nickel chromium steel turnings.

The charge was constituted as follows:—

| | Cwts. | Qrs. |
|---|---|---|
| Basic open hearth refined nickel steel scrap | 124 | 0 |
| Ordinary nickel chromium steel turnings | 10 | 0 |
| Ferro-chrome (4.5% C, and 70% Cr) | 3 | 0 |
| Total | 137 | 0 |

Carbon in the form of electrode-carbon in small pieces____ 50 lbs.
Ferro-silicon____ 50 lbs.
Limestone____ 3 cwts.

When charging the basic electric furnace, about 30 cwts. of the basic open hearth refined nickel steel scrap were placed on the furnace bottom and then the whole of the ferro-chrome was added, this being placed as nearly as possible under the furnace electrodes. A further 30 cwts. of the refined nickel steel scrap were then charged into the furnace and then the whole of the ferro-silicon spread over the charge, care being taken to keep the latter off the furnace banks and bottom. The limestone was then added and also the remainder of the refined nickel steel scrap and afterwards the whole of the nickel chromium steel turnings was added to make good contact between the larger pieces of the charge and the electrodes. The carbon was added near the bottom of the charge to increase the carbon content of the bath when melted, because the carbon in the basic open hearth refined nickel steel scrap was only .24%, a higher carbon percentage being required in the finished steel.

The charge was then melted by switching on an electric current, the furnace being well sealed until the charge was melted, which took place in about three and a half hours. The voltage of the current during melting of the charge was about 90. After melting, the voltage was reduced to about 80 in order to avoid local overheating of the metal. The slag when melted was comparatively low in reducible oxide constituents.

A sample of the molten metal taken when the charge was melted gave:—
Carbon .54%, P .010% and Cr 1.50%.

Shortly afterwards, 1 cwt. of hematite iron ore was added to the bath which was boiling steadily. A further sample taken about half an hour after melting gave carbon .50%. About half an hour later, about half of the slag produced was removed and further oxidation of the bath to remove carbon stopped by an addition of about 90 lbs. of ferro-silicon. The slag at the period of "slagging off" was more reduced than at the stage when the charge was melted and was fairly high in silica. Immediately after slagging, about 2 cwts. of limestone were added to the slag, and at intervals, small additions of limestone, flour spar and anthracite were made until the slag was reduced, which occurred about thirty minutes after stopping the boil. Samples taken at this time gave:—

| C | S | Cr. | Ni |
|---|---|---|---|
| .47 | .023 | 1.68 | 2.18 |

A sample taken half an hour later still gave .47% carbon.

The final additions of carbon, nickel and chromium required to produce nickel chromium steel of the required composition, were then made and the heat got ready for tapping, about 2 lbs. of aluminium, in the form of ferro-aluminium, being added with the additions as a final quieter. About half an hour later the metal was tapped into a ladle, about 2 lbs. of aluminium being added to the ladle as an extra precaution to ensure settling and prevent unsoundness of the metal. The steel produced had in this example the following composition:—

| C | Si | S | P | Mn | Cr | Ni |
|---|----|---|---|----|----|-----|
| .61 | .20 | .018 | .009 | .10 | 2.51 | 2.73 |

The following is another typical example of a method of producing flawless nickel chromium steel according to the invention, using therefor pure ingot iron as the base material. The charge was constituted as follows:—

| | Tons | Cwts. | Qrs. | Lbs. |
|---|---|---|---|---|
| Pure ingot iron | 5 | 0 | 0 | 0 |
| Ferro-chrome, 7.7% C. 65.2% Cr | | 2 | 2 | 0 |
| Nickel | | 2 | 2 | 0 |
| | 5 | 5 | 0 | 0 |

Anthracite Nuts _____ 54 lbs.
Ferro Silicon _____ 40 lbs.
Limestone _____ 4 cwts.
Fluor spar _____ ½ cwt.

In charging the electric furnace with these materials, all the anthracite nuts were placed on the bottom of the furnace and directly covered with about 25 cwts. of the pure ingot iron and the limestone slag forming materials, namely the limestone and fluor spar. The whole of the ferro-chrome, which will add about 1.55% of chromium to the metal produced, was then placed as nearly as possible under the furnace electrodes together with the amount of nickel approximating that required in the finished steel. The remainder of the pure ingot iron and the ferro-silicon were then charged into the furnace. The electric current was then switched on and the melting effected as quickly as possible, the furnace being well sealed throughout the melting operation. The placing of the ferro-chrome under the electrodes so as to be under the electric arcs, is of importance as this insures early melting of the ferro-chrome and formation of a rich chrome bath.

In this example, the melting was effected in about two hours and a sample of the molten metal was found to contain about .85% C, .024% P and 1.34% Cr. The charge was then allowed to boil gently and after about three quarters of an hour, small charges of iron ore, for example hematite ore, say in about ½ cwt. lots, were added at suitable intervals, say of about one hour each, so as to enable the boiling to be effected slowly and the percentage of carbon, which was too high, to be gradually reduced. In the example now being given, the percentage of carbon in the molten metal was gradually reduced from about .85% mentioned, to about .51% after about three hours fifty minutes from the time of melting, the decarburizing of the metal being thus slew. After about four hours twenty minutes from the time of melting, about half the slag produced was removed, then about sixty pounds of 50% ferro-silicon were added to the bath to arrest the boiling and a charge of slag forming materials consisting of about four cwts. of limestone, one half hundredweight of fluor spar and 8 lbs. of powdered coal (anthracite) was added to form a reducing and refining slag. About thirty four minutes later a sample of the molten metal was found to contain .47% C, .016% S, .017% P, .99% Cr, 2.41% Ni, the slag being then grayish white and reducing. About one hour later, the final additions of carbon, nickel and chromium to bring the steel to the desired composition were made and the metal tapped about one quarter of an hour later. The heat occupied about eight and a half hours. Before tapping, a small quantity of aluminium, say about .017 of one per cent of the molten metal, was added to the bath as a quieter. After tapping, about two pounds of aluminium were added to the molten metal in the ladle as an extra precaution to prevent unsoundness of the resulting steel.

The following is another method of producing flawless nickel chromium steel according to the invention, using therefor pure ingot iron as the refined base metal. The charge was constituted as follows:—

| | Cwts. | Qrs. | Lbs. |
|---|---|---|---|
| Pure ingot iron | 131 | 0 | 0 |
| Ferro-chrome | 3 | 0 | 0 |
| Nickel | 3 | 1 | 0 |
| | 137 | 1 | 0 |

Anthracite _____ 28 lbs.
Ferro-silicon _____ 50 lbs.
Limestone _____ 2 cwts.
Fluor spar _____ ¾ cwt.

In charging the electric furnace with these materials, the furnace bottom was covered with pure ingot iron and the anthracite added in small pieces, with the ferro-chrome, the nickel and ferro-silicon were then added and the furnace charged with a further portion of pure ingot iron, the limestone being added at about one third of the way up from the bottom of the charge. The furnace was then well luted or sealed up and the current switched on. The charge melted normally and the furnace was kept well sealed until about two hours and ten minutes after switching on the current when the furnace was opened and the remainder of the pure ingot iron added and the furnace again sealed up. The furnace was kept sealed for about thirty minutes, then opened, one half hundredweight of fluor spar added, the furnace again sealed up for about three quarters of an hour when the charge was completely melted, that is to say in about three and a half hours after switching on the current. A sample of the metal was found to contain C .12%, Cr .96%, and P .010%. A further addition of one quarter hundredweight of fluor spar was then made. After about eighteen minutes, a quarter of the slag was taken off, the slagging being finished about seven minutes later. About eighty pounds of ferro-silicon and about sixty five pounds of broken carbon electrodes were then added to stop oxidation, after which for refining purposes, one and a half hundredweights of limestone, five pounds of crushed anthracite and three pounds of fluor spar were added and shortly afterwards twenty pounds more ferro-silicon were added followed by three pounds of crushed anthracite and one and a half hundredweights of ferro-chrome (75% Cr). The bath was shortly afterwards well rabbled and a sample thereof gave C .37, Cr 1.92, Ni 2.40. A sample of the slag was white. Two pounds of crushed anthracite were added ten minutes later and ten minutes afterwards the metal contained C .38%. A further four pounds of crushed anthracite were added a few minutes later, the slag at this time being grey. After twenty minutes longer, the furnace electrodes were dipped for five minutes in the metal bath to increase the percentage of carbon. Ten minutes later, three quarters twenty four pounds of ferro-chrome, two quarters two pounds of nickel and two pounds of crushed anthracite were added to the molten metal which then contained .50% of carbon. After half an hour a sample of the slag was found to be grey. A quarter of an hour later one hundredweight three quarters of hæmatite pig iron, six pounds of ferro-chrome, six pounds of nickel and sixteen pounds of ferro-manganese were added to the bath which was then got ready for tapping. Shortly afterwards two pounds of crushed anthracite were added to keep the slag grey. A quarter of an hour later two pounds of aluminium, as ferro-aluminium, were added followed about twelve minutes later by one pound of crushed anthracite. A few minutes later the metal bath was tapped into a ladle to which two pounds of aluminum were added. The analysis of the flawless steel obtained was

| C | Si | S | P | Mn | Cr | Ni |
|---|---|---|---|---|---|---|
| .61 | .19 | .013 | .014 | .12 | 2.42 | 2.71 |

The duration of the heat was seven hours ten minutes.

In this example it will be seen that no iron ore was added during the oxidation or boiling period, which was brief, the oxides in the slag being at this time reduced. During the refining, the reduction was effected by grey carbide slags, and carburization of the molten metal was also assisted by dipping the furnace electrodes in the metal. Also, the ferro-chrome, nickel and iron additions were made earlier than in the previous examples hereinbefore given. The deoxidation and desulphurization of the metal by means of slags of medium carbide content was effective, as indicated by the fact that the final sulphur in the steel was only .013%.

Carbon steel can be produced according to the invention by using therefor pure ingot iron as a base material with ferro-silicon, carbon and lime, the process adopted being similar to that hereinbefore described for the production of nickel chromium steel except that no addition of nickel or chromium is made to the metal bath at any stage of the process.

According to one typical example for producing carbon steel, the charge was constituted as follows:—

|  | Cwts. | Qrs. | Lbs. |
|---|---|---|---|
| Pure ingot iron | 155 | 0 | 0 |
| Anthracite nuts |  |  | 50 |
| Ferro silicon (45%) |  |  | 60 |
| Fluor spar |  | 1 | 0 |
| Limestone | 2 | 0 | 0 |

About 30% of the pure ingot iron was placed on the bottom of the electric furnace, the ferro-silicon and anthracite then spread over the iron, a further 30% of the pure ingot iron then added, then the limestone and fluor spar were spread over the iron and the remainder of the iron then added. The electric current was then switched on and the charge melted. The bath melted out with a carbon content of .41% and with a slag of medium reducible oxide content and relatively high in silica. The metal bath in this case was boiled slowly to reduce the carbon, which was higher than required, to the desired lower degree, the slag taken off at intervals, and additions of lime, flour spar and iron ore also made at intervals to effect slow boiling. The boil was stopped by addition of ferro-silicon, and a reducing slag put on as in the other examples hereinbefore described. Ferro-manganese was also added at this stage to the molten bath as it was desired that the carbon steel to be produced should contain manganese. In other respects, the process was carried in a similar manner to the processes hereinbefore described except that no addition of chromium or nickel was made to the refined steel produced. One or both of these elements could however be added to the molten purified steel so produced, if it be desired to produce chromium steel, or nickel steel, or nickel chromium steel.

From the foregoing description it will be seen that the process can be variously modified to suit varying conditions prevailing in the furnace and to suit varying requirements, without departing from the main features of the process necessary for producing various kinds of steel low in sulphur and phosphorus and capable of being cast, forged hardened and tempered with little or no liability of flaws being set up therein during the casting, forging hardening and tempering treatments.

When treating liquid refined iron or steel, constituting the refined base betal, made in an open hearth furnace, the liquid metal is transferred from such furnace to the electric furnace and treated therein substantially in the manner hereinbefore described for treating the refined base metal melted in the electric furnace from refined solid base metal, carbon being added or not to the liquid charge as may be desired.

Steel made as hereinbefore described is found to be not only of great purity as regards sulphur and phosphorus, but is also particularly free from liability to develop flaws or defects after being cast and otherwise treated, including hardening and tempering, to adapt it for various uses.

What I claim is:—

1. The method of producing flawless steel low in sulphur and phosphorus, said method consisting in heating molten refined base metal of the character herein referred to, in a basic electric furnace in the presence of deoxidant material and of basic slag forming material comprising lime, and subsequently subjecting the treated metal to the action of a deoxidizing and refining slag to reduce the percentage of sulphur and phosphorus in the metal to the desired low limits.

2. The method of producing flawless steel low in sulphur and phosphorus, said method consisting in heating molten refined base metal of the character herein referred to, in a basic electric furnace whilst in intimate contact with deoxidizing ferro-alloy material and basic slag forming material comprising lime, and subsequently subjecting the treated metal to the action of a deoxidizing and refining slag to reduce the percentage of sulphur and phosphorus in the metal to the desired low limits.

3. The method of producing flawless steel low in sulphur and phosphorus, said method consisting in heating molten refined base metal of the character herein referred to, in a basic electric furnace with a deoxidizing ferro-alloy, carbon and basic slag forming material comprising lime, and subsequently subjecting the treated metal to the action of a deoxidizing and refining slag to reduce the percentage of sulphur and phosphorus in the metal to the desired low limits.

4. The method of producing flawless alloy steel low in sulphur and phosphorus, said method consisting in heating a molten charge of refined alloy steel of the character herein referred to, with a deoxidizing ferro-alloy and basic slag forming material comprising lime, in a basic electric furnace, and subsequently subjecting the treated metal to the action of a deoxidizing and refining slag to reduce the percentage of sulphur and phosphorus in the metal to the desired low limits.

5. The method of producing flawless nickel-chromium steel low in sulphur and phosphorus, said method consisting in heating a molten charge of refined nickel-chromium steel in contact with ferro-chrome and ferro-silicon and in the presence of basic slag forming material comprising lime, in a basic electric furnace and subsequently subjecting the heated metal to the action of a deoxidizing and refining slag to reduce the percentage of sulphur and phosphorus in the metal to the desired low limits.

6. A method of producing flawless steel low in sulphur and phosphorus, consisting in heating a molten charge of refined base metal in a basic electric furnace in the presence of ferro-alloy deoxidizing material and slag forming material, subsequently removing part of the slag formed, adding a deoxidant and also materials to form a reducing slag, continuing the heating until the molten metal has attained the desired degree of purity as regards sulphur and phosphorus, adjusting the composition of the molten metal by addition of material to suit requirement and tapping the resulting metal, substantially as described.

7. A method of producing flawless steel low in sulphur and phosphorus, consisting in heating a molten charge of carburized refined base metal in a basic electric furnace in the presence of ferro-alloy deoxidizing material and slag forming material, causing slow boiling of the molten metal by addition of an oxidant, in small quantity at a time, removing part of the slag formed, stopping the boil by addition of a deoxidant when the percentage of carbon has been reduced to the desired degree, adding to the molten metal materials to form a reducing slag, continuing the heating until the metal has attained the desired degree of purity as regards sulphur and phosphorus, adjusting the composition of the molten metal by addition of material to suit requirement and tapping the resulting metal.

8. A method of producing flawless steel low in sulphur and phosphorus consisting in melting a charge comprising refined base alloy metal, a ferro-deoxidant alloy, carbon and lime in a basic electric furnace, continuing the heating under slow oxidizing condition until the carbon attains a desired percentage, a portion of the slag being removed during this stage of the process, adding a deoxidant to the molten metal to stop the oxidation, adding to the slag on the molten metal materials to form a reducing and refining slag, refining the metal by the aid of the reducing and refining slag until the desired purity of the metal as regards sulphur and phosphorous is attained, adding aluminum to the resulting steel and tapping the refined steel from the furnace.

9. A process for the manufacture of flawless nickel chromium steel low in sulphur and phosphorus, said process consisting in melting a charge comprising refined base metal, nickel, ferro-chrome, carbon ferro-silicon and lime in a basic electric furnace, reducing the percentage of carbon in the molten metal by slow boiling with the aid of an oxidant added in small quantities at a time, removing a portion of the resulting slag, stopping the boil by the addition of a deoxidizing agent when the carbon has been reduced to the desired extent, adding to the remaining slag, materials to form a reducing slag, continuing the heating of the molten metal to reduce sulphur and phosphorus to the desired low percentage, adjusting the composition of the steel to suit requirement by suitable additions of the desired elements to the molten bath and tapping the resulting steel from the furnace.

10. A process for the manufacture of flawless nickel chromium steel low in sulphur and phosphorus, said process consisting in melting a charge comprising refined base metal, nickel, ferro-chrome, carbon, ferro-silicon and lime in a basic electric furnace, reducing the percentage of carbon in the molten metal by slow boiling with the aid of an oxidant added in small quantities at a time, removing a portion of the resulting slag, stopping the boil by the addition of a deoxidizing agent when the carbon has been reduced to the desired extent, adding to the remaining slag, materials to form a reducing slag, continuing the heating of the molten metal to reduce sulphur and phosphorus to the desired low percentage, adjusting the composition of the steel to suit requirement by suitable additions of the desired elements to the molten bath, adding a deoxidant to the resulting steel and tapping the steel from the furnace.

11. A process for the manufacture of flawless nickel chromium steel low in sulphur and phosphorus, said process consisting in melting a charge of pure iron with ferro-chrome, nickel, carbon, ferro-silicon and lime in a basic electric furnace, heating the resulting molten bath, removing a portion of the slag therefrom, adding deoxidant material to the bath, to stop oxidation thereof, adding materials to form a reducing and refining slag, continuing the heating of the molten bath until it attains the desired degree of purity as regards sulphur and phosphorus, adjusting the composition of the metal as regards carbon, nickel and chromium to suit requirement, and tapping the resulting metal from the furnace.

12. A process for the manufacture of flawless nickel chromium steel low in sulphur and phosphorus, said process consisting in melting a charge of pure iron with ferro-chrome, nickel, carbon, ferro-silicon and lime in a basic electric furnace, heating the resulting molten bath, removing a portion of the slag therefrom, adding deoxidant material to the bath, to stop oxidation thereof, adding materails to form a reducing and refining slag, continuing the heating of the molten bath until it attains the desired degree of purity as regards sulphur and phosphorus, adjusting the composition of the metal as regards carbon, nickel and chromium to suit requirement, adding aluminium to the resulting molten steel and tapping the metal from the furnace.

13. A process for the manufacture of flawless nickel chromium steel low in sulphur and phosphorus, said process consisting in melting a charge of pure iron with ferro-chrome, nickel, carbon, ferro-silicon and lime in a sealed basic electric furnace, subjecting the resultant molten bath to oxidation removing a portion of the slag, adding a deoxidant to the bath to stop oxidation, adding to the bath, materials to form a reducing and refining slag, continuing to heat the bath further to refine the same, adjusting the composition of the resulting steel to suit requirement as regards carbon, nickel and chromium by suitable additions of the desired elements to the molten metal, the slag being maintained in a grey condition during the refining period by addition of carbon thereto, adding aluminum to the refined steel and tapping the refined steel from the furnace.

14. The method of producing flawless steel low in sulphur and phosphorus, said method consisting in melting a charge of refined base metal of the character herein referred to, a deoxidant and basic slag forming material, comprising lime, in a basic electric furnace, continuing the heating of the resulting molten metal in the presence of the deoxidant and basic slag forming material and subsequently subjecting the treated metal to the action of a deoxidizing and refining slag to reduce the percentage of sulphur and phosphorus therein to the desired low limit.

15. The method of producing flawless steel low in sulphur and phosphorous, said method consisting in melting a mixed charge of refined base metal of the character herein referred to, a deoxidant and basic slag forming material, comprising lime, in a basic electric furnace, continuing the heating of the resulting molten metal in the presence of the deoxidant and basic slag forming material, and subsequently subjecting the treated metal to the required action of a deoxidizing and refining slag material to reduce the percentage of sulphur and phosphorus in the metal to the desired low limit, the furnace being sealed during the melting of the charge and subsequent continued heating of the metal.

16. The method of producing flawless alloy steel low in sulphur and phosphorus, said method consisting in melting a mixed charge of refined alloy steel of the character herein referred to, a deoxidant in the form of a ferro-alloy, carbon and basic slag forming material comprising lime, in a basic electric furnace, continuing the heating of the resulting molten metal in the presence of the said deoxidant and slag forming material and subsequently subjecting the treated metal to the action of a deoxidizing and refining slag to reduce the percentage of sulphur and phosphorus therein to the required low limits.

Signed at Warwick House Street, Westminster in the county of London, England, this eighth day of November, 1922.

ROBERT ABBOTT HADFIELD.